United States Patent
Kelley et al.

(10) Patent No.: US 7,113,797 B2
(45) Date of Patent: Sep. 26, 2006

(54) SYSTEM, METHOD AND PROGRAM PRODUCT FOR SCHEDULING MEETINGS

(75) Inventors: Edward E. Kelley, Wappingers Falls, NY (US); Tijs I. Wilbrink, RD Voorburg (NL)

(73) Assignee: International Business Machines Corporation, Armonk, NY (US)

( * ) Notice: Subject to any disclaimer, the term of this patent is extended or adjusted under 35 U.S.C. 154(b) by 186 days.

(21) Appl. No.: 10/704,101

(22) Filed: Nov. 6, 2003

(65) Prior Publication Data

US 2005/0101335 A1    May 12, 2005

(51) Int. Cl.
*H04Q 7/20* (2006.01)
(52) U.S. Cl. .................. 455/456.2; 455/456.1; 455/457; 455/456.6
(58) Field of Classification Search ........... 455/456.3, 455/456.1, 456.2, 456.4, 456.5, 456.6, 457, 455/422.1, 403, 404.2, 432.3, 566, 414.1, 455/410, 411
See application file for complete search history.

(56) References Cited

U.S. PATENT DOCUMENTS

| | | | |
|---|---|---|---|
| 5,504,491 A | 4/1996 | Chapman | 342/357 |
| 5,642,303 A | 6/1997 | Small | 364/705 |
| 5,790,974 A | 8/1998 | Tongnazzini | 701/204 |
| 5,948,040 A | 9/1999 | DeLorme et al. | 701/201 |
| 6,177,905 B1 | 1/2001 | Welch | 342/357.13 |
| 6,360,169 B1 | 3/2002 | Dudaney | 701/213 |
| 6,611,755 B1 | 8/2003 | Coffee et al. | 701/213 |
| 6,714,916 B1 | 3/2004 | Robertson et al. | 705/9 |
| 6,968,179 B1* | 11/2005 | De Vries | 455/414.1 |
| 2002/0054174 A1 | 5/2002 | Abbott et al. | 345/863 |
| 2002/0067308 A1 | 6/2002 | Robertson | 342/357 |
| 2003/0027558 A1* | 2/2003 | Eisinger | 455/414 |
| 2003/0046304 A1 | 3/2003 | Peskin et al. | 707/104.1 |
| 2003/0060979 A1 | 3/2003 | Andrews et al. | 701/213 |
| 2003/0137435 A1 | 7/2003 | Haddad et al. | 340/994 |
| 2003/0146854 A1 | 8/2003 | Jones | 340/988 |
| 2004/0176107 A1* | 9/2004 | Chadha | 455/456.5 |
| 2004/0203901 A1* | 10/2004 | Wilson et al. | 455/456.1 |
| 2005/0143097 A1* | 6/2005 | Wilson et al. | 455/456.3 |

* cited by examiner

*Primary Examiner*—Joseph Feild
*Assistant Examiner*—David Q. Nguyen
(74) *Attorney, Agent, or Firm*—Arthur J. Samodovitz

(57) ABSTRACT

System, method and program product for scheduling meetings. Two or more invitees for a meeting are identified. Each of the invitees has a wireless device with a GPS or other geographic locating unit. Locations of the wireless devices are tracked. When the wireless devices of the two or more invitees are within a specified proximity of each other or a specified proximity of a specified location, then an attempt is made to schedule a meeting with the two or more invitees. A user specifies the proximity. The user can specify a greater proximity if the meeting is not scheduled by a certain date to increase the chance that the meeting will be scheduled. Another system, method and program product for reminding a person. A business or residence containing an object of a reminder is identified. A wireless device of a person to be reminded of the object is identified. A location of the wireless device is tracked. When the wireless device is within a specified distance or specified proximity of the business or residence, then the reminder is sent to the wireless device. A user specifies the reminder to be sent to the wireless device. Also, the user specifies the proximity.

12 Claims, 4 Drawing Sheets

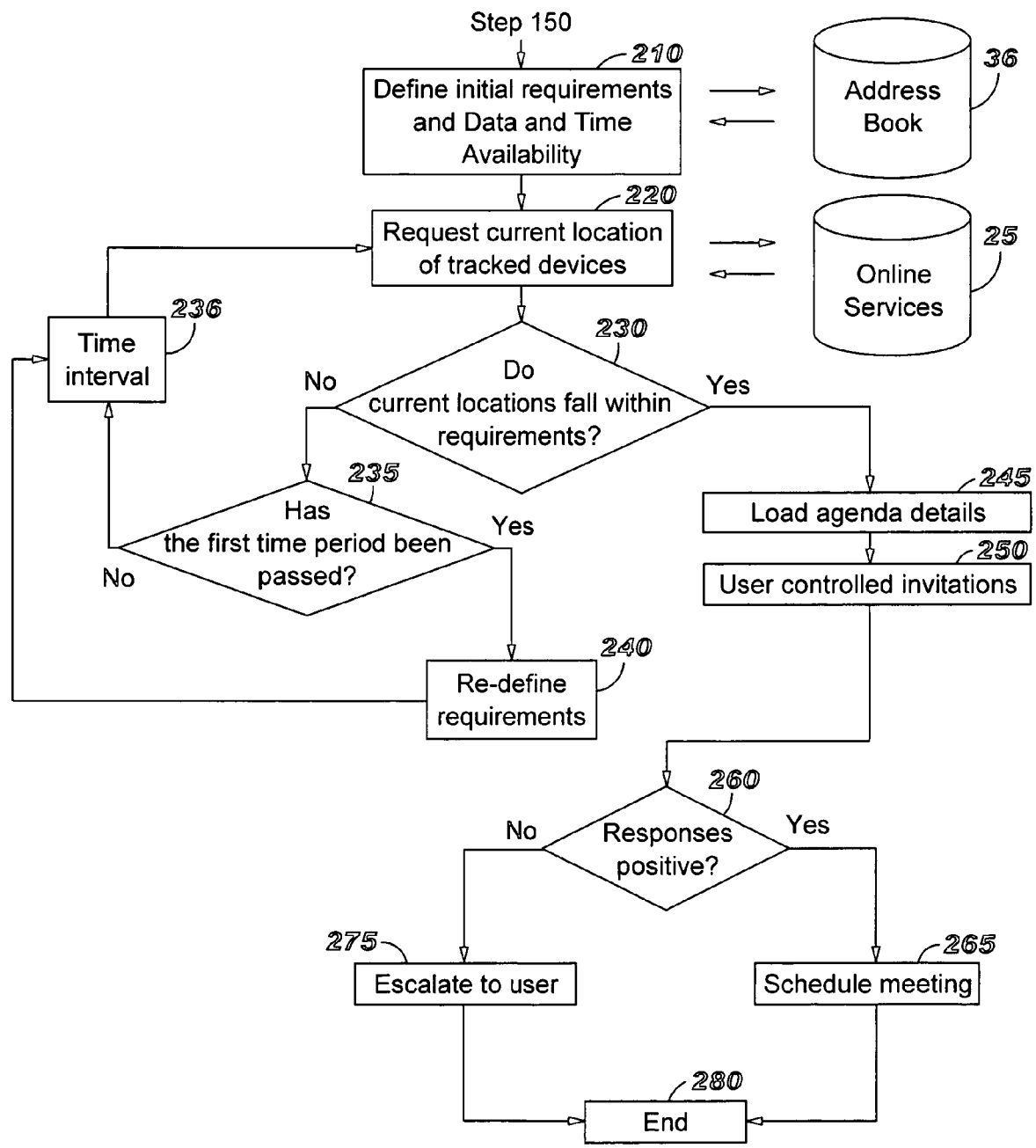

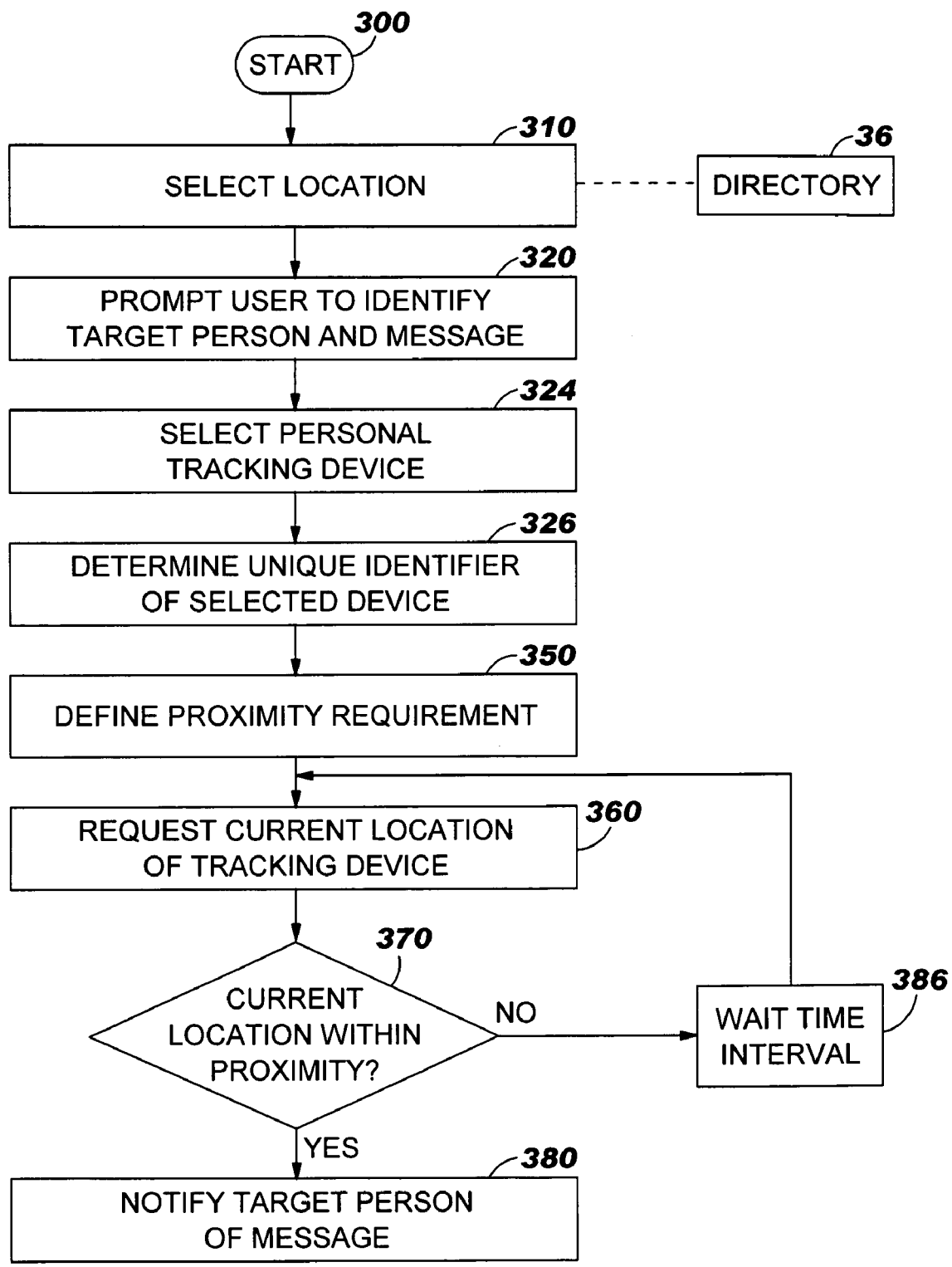

SYSTEM, METHOD AND PROGRAM PRODUCT FOR SCHEDULING MEETINGS

BACKGROUND OF THE INVENTION

The invention relates generally to information technology, and deals more specifically with systems, methods and programs to schedule meetings.

Various program tools are known today to schedule meetings. For example, Lotus Notes Calendar tool (from International Business Machines Corporation) allows a user to identify the prospective invitees for the meeting and then query the tool for dates and times when all of the prospective invitees are available to meet. The tool determines the availability based on other meetings or absences previously scheduled and recorded by the tool. Then, the user selects an available date and time. The user can request the meeting by conference call or in person, and in the latter case, specify the meeting location. While the foregoing scheduling tools are effective, in some cases, an in-person meeting is needed but not convenient because of the distance between the invitees.

Accordingly, an object of the present invention is to schedule meetings at times and locations that are convenient for the invitees.

Another object of the present invention is to provide a technique to effectively remind a person to do something.

SUMMARY OF THE INVENTION

The invention resides in a system, method and program product for scheduling meetings. Two or more invitees for a meeting are identified. Each of the invitees has a wireless device with a GPS or other geographic locating unit. Locations of the wireless devices are tracked. When the wireless devices of the two or more invitees are within a specified proximity of each other or a specified proximity of a specified location, then an attempt is made to schedule a meeting with the two or more invitees.

According to features of the present invention, a user specifies the proximity. The user can specify a greater proximity if the meeting is not scheduled by a certain date to increase the chance that the meeting will be scheduled.

The invention also resides in a system, method and program product for reminding a person. A business or residence containing an object of a reminder is identified. A wireless device of a person to be reminded of the object is identified. A location of the wireless device is tracked. When the wireless device is within a specified distance or specified proximity of the business or residence, then the reminder is sent to the wireless device.

According to features of the present invention, a user specifies the reminder to be sent to the wireless device. Also, the user specifies the proximity.

BRIEF DESCRIPTION OF THE FIGURES

FIGS. 2(A) and 2(B) form a flow chart of the scheduling tool of FIG. 1.

FIG. 3 is a flow chart of an alternate embodiment of the present invention.

DETAILED DESCRIPTION OF THE PREFERRED EMBODIMENTS

Figure 1:
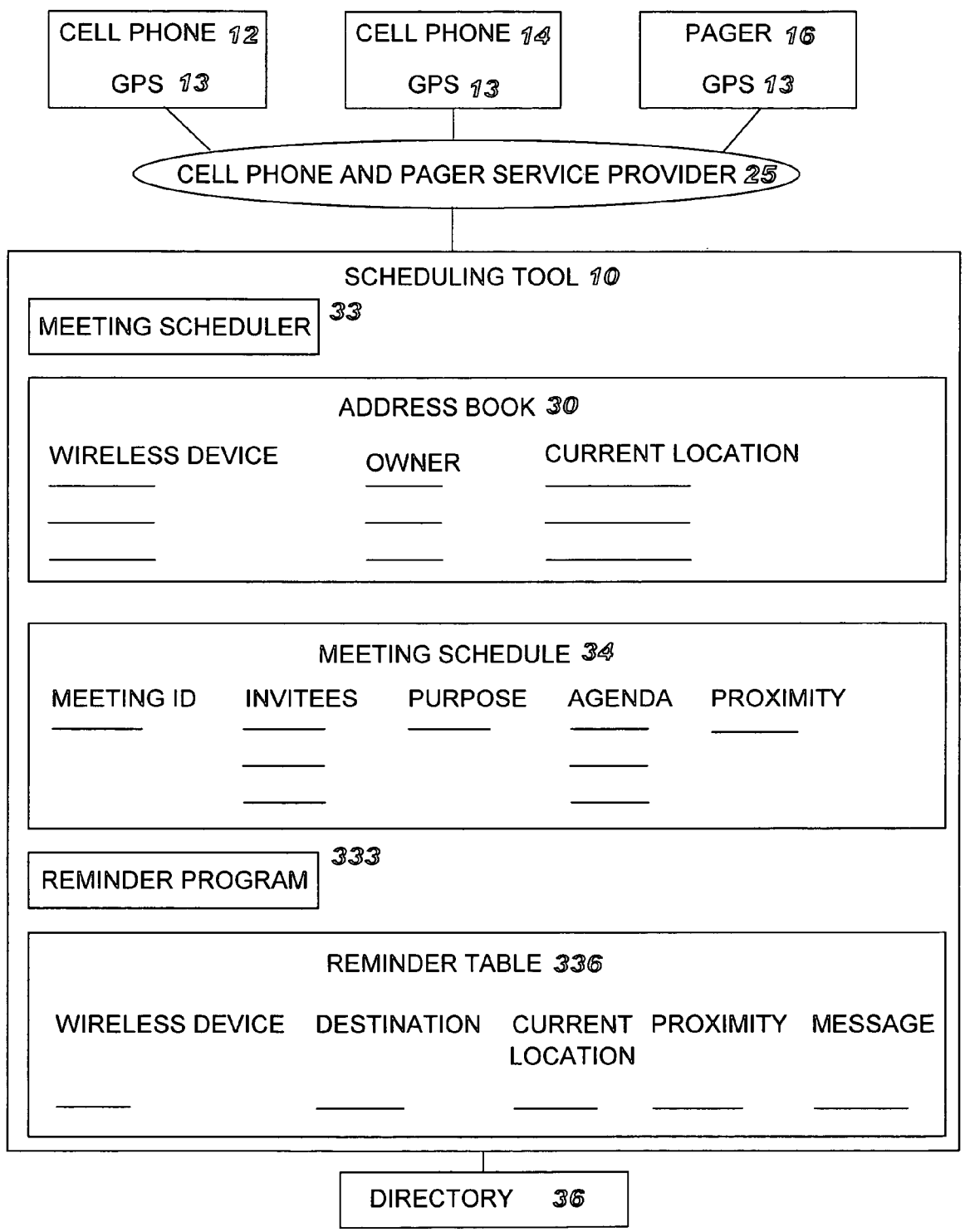
FIG. 1 is a block diagram of a system including a scheduling tool which includes the present invention.

FIG. 1 illustrates a scheduling program tool 10 and wireless devices 12, 14 and 16 owned by potential invitees to a meeting, according to one embodiment of the present invention. Each of the devices 12, 14 and 16 includes a respective GPS unit 13, 15 and 17 which communicates with satellites, not shown, to determine their geographic positions. These devices may also be equipped with a different means to track its location, for example, cell phones would be tracked through signals sent and received by the operator. Once determined, the devices 12, 14 and 16 can communicate their geographic positions to scheduling tool 10 via a wireless device service provider 25 (such as a cell phone service provider). Alternately, the devices 12, 14 or 16 may send their geographic position through another available communications network, such as the internet, a company network or a low cost connection like GPRS.

As described in more detail below, scheduling tool 10 maintains an address table or "book" 30 of a multitude of wireless devices such as devices 12, 14 and 16, which are owned by potential invitees to meetings. These devices may have been previously registered with scheduling tool 10 by the owner or could have been registered by the employer of the owner, if any. The address book may be the user's own address book within an application such as IBM Lotus Notes application, or an online available address application such as IBM BluePages application. (Information on wireless devices such as cellphones would be available from these applications even without the present invention.) The address book 30 lists the identity of each device, its registered owner and its current location, if known. The current location is determined by the respective GPS device of the wireless device and relayed by the wireless device to scheduling tool 10. Scheduling tool 10 also includes a scheduler program 33 which maintains a meeting schedule table 34 which lists proposed meetings between owners of the devices 12, 14, 16, . . . , the list of invitees for each meeting, the purpose of each meeting, a blank field for the meeting location, and links to previous correspondence between the invitees on the subject of the meeting. Scheduling tool 10 has access to an electronic directory 36 with the telephone numbers and nominal addresses of the owners of the devices 12, 14, 16 and the IP addresses of the wireless devices of the owners.

As explained in more detail below, when a user of scheduling tool 10 initiates a meeting request for specified invitees, scheduler program 33 determines which, if any, of the invitees have a registered wireless device with a GPS. If one or more of the invitees has such a registered device, then scheduler program 33 prompts the user to decide whether to request that the meeting be incidentally scheduled when all the invitees are within a predefined distance of each other. For the invitees without a registered wireless device with a GPS, their location will be fixed and presumed to be their nominal address (business or otherwise). The nominal address is found in directory 36. When the scheduler program 33 determines that all the invitees are within the prescribed distance of each other, the scheduling tool 10 prompts the user to decide if the incidental meeting should be called. Then, the user can request from scheduling tool 10 the current location of the proposed invitees. If the user then decides to schedule an incidental meeting, the scheduling tool 10 sends a meeting request to the invitees. If they all accept, then the scheduling tool notifies the invitees, via their wireless devices, of the incidental meeting and its time, location and purpose. Alternatively, if the user's wireless device is not enabled to handle meeting notices and invitations, the notice may be sent to an email address or to the personal assistant of the invitee. This would occur when the device has been turned off, or the invitee has chosen to have a different device handling meeting notices and invitations.

Figure 2A:
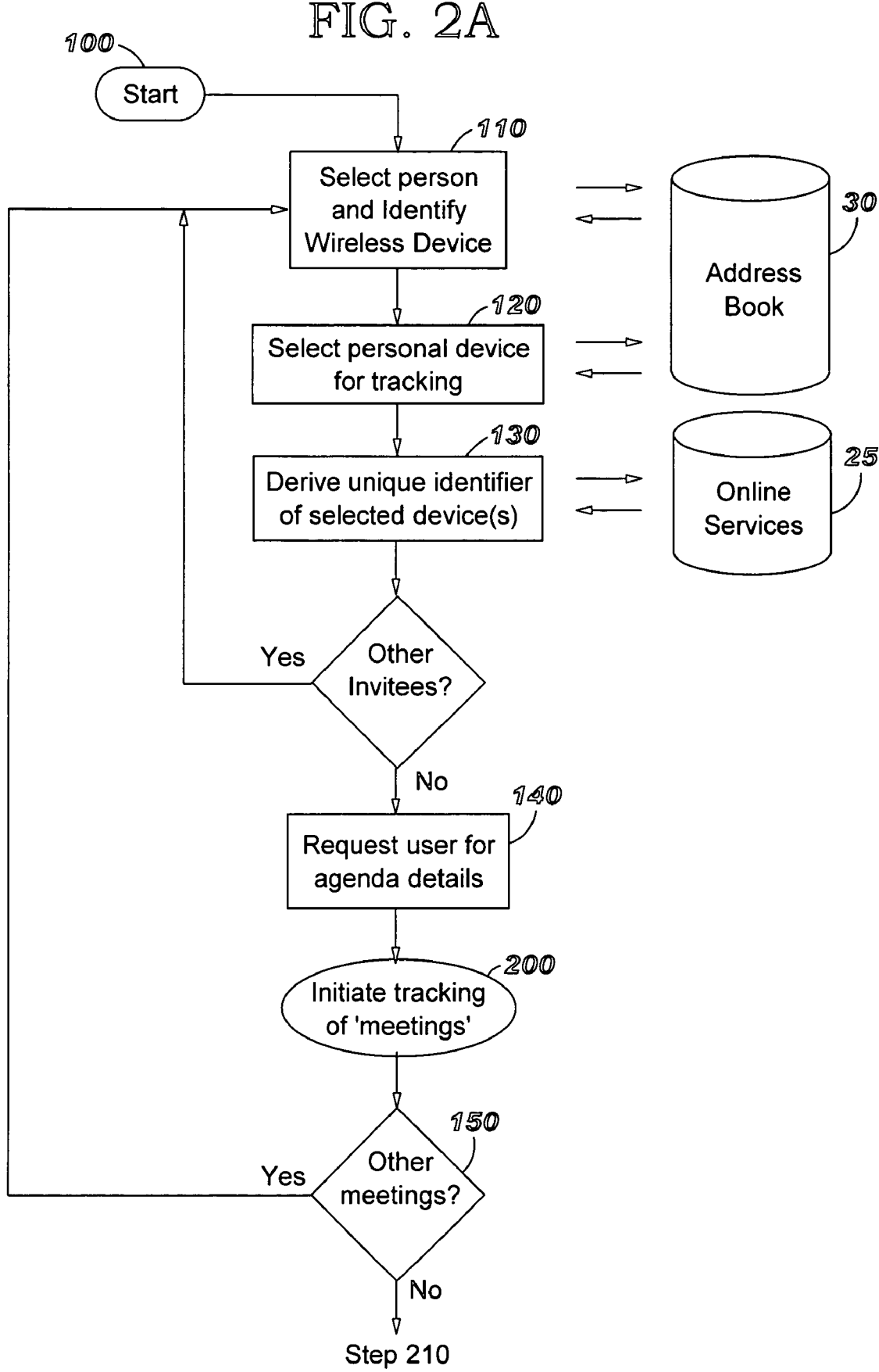

FIGS. 2(A) and (B) illustrate the use and function of scheduling tool 10 in more detail. Initially, a user accesses the scheduling tool 10 by supplying a valid userID and password, or simply "clicking" on a scheduling tool 10 icon (if the user is already logged on) (step 100). Next, the user identifies an invitee by name (step 110). In response, scheduler program 33 reads the address book 30 to learn if the invitee has one or more registered wireless device with a GPS unit (step 110). If so, scheduler program 33 determines which if any of the wireless devices should be used for tracking the owner for the incidental meeting (step 120). This determination is made by tracking both initially, and determining which of the wireless devices moves most often, over a long period of time or a shorter, more recent period of time. The wireless device that moves most often is presumed to be the wireless device that accompanies the owner most often, and is used for tracking the owner for scheduling the meeting. Next, the scheduler program 33 determines the unique identifier of the wireless device based on the telephone number of the cell phone or in the case of a PDA, by negotiation during the registration process (step 130). (A cell phone service provider 25 keeps track of how to contact each cell phone based on its telephone number or unique identifier.) Referring again to step 110, if the invitee is not listed in the address book, then scheduler program 33 prompts the user to identify a wireless device with a GPS that the invitee owns (step 110). This identification is the telephone number of the wireless device. This identification is sufficient to permit the scheduling tool 10 to obtain the unique identifier of the wireless device. Next, scheduler program 33 prompts the user to identify another invitee for the meeting, if any, and steps 110–130 are repeated for each additional invitee.

After all the invitees have been identified, scheduler program 33 prompts the user to specify the purpose of the meeting and agenda, preferred meeting locations, and preferred dates and times of the meetings (step 140). As explained in more detail below, the purpose of the meeting will be displayed to the invitees when the incidental meeting is scheduled. Next, scheduler program 33 prompts the user to identify another meeting to be scheduled, if any (step 150). In addition to this functionality, the system may use other known scheduling programs, like the scheduling function in IBM Lotus Notes application, to manage the ad-hoc appointment convenient for all users.

After a meeting has been defined in steps 110–200, scheduling tool 10 starts a process to determine if and when the incidental meeting can be scheduled. Accordingly, scheduler program 33 prompts the user to specify proximity requirements for the meeting, i.e. a maximum distance between all the invitees to permit an incidental meeting, and available time and dates for the meeting. The available dates and times are based on dates and times not already scheduled by any of the invitees for other meetings or absences. As explained above, the table 34 lists the other meetings and absences already scheduled for the invitees. As explained above, the wireless devices periodically report their location to the scheduling tool on an ongoing basis or only when notified that they are listed as in invitee in a meeting which can be scheduled incidental. Next, scheduling tool 10 reads from address book 30 the current location of the wireless devices of the invitees (step 220). Next, scheduler program 33 determines if the current locations of all the invitees are within the maximum distance specified in step 210 (decision 230). If not, scheduler program 33 determines if the first date and time which the user specified as available for the meeting has passed (decision 235). If not, the scheduler program 33 waits a predetermined time period such as one hour (step 236), and then loops back to step 220 as described above. However, if the first date and time which the user specified as available for the meeting has passed, then scheduler program 33 prompts the user to redefine the proximity requirement to permit the incidental meeting and list of invitees; some of the invitees may even be designated as optional (step 240). If the user is eager for the meeting, then the user may increase the allowed proximity to permit the incidental meeting. In the case of an optional invitee, a meeting will be scheduled if all the other invitees are within the specified proximity, and the optional invitees will be invited regardless of their location. Then, scheduler program 33 waits the predetermined time period (step 236), and then loops back to step 220 as described above. Referring again to decision 230, if the registered, wireless devices owned by all the invitees are currently located within the prescribed distance or proximity of each other, the scheduler program 33 reads the meeting purpose from table 34 (step 245). Then, scheduler program 33 notifies the user that all invitees are within close range of each other, the general geographic location of each of the invitees, and the purpose of the meeting (step 250). (The general and not specific location of each of the invitees is provided to the user to protect the privacy of the invitees.) In response, the user can select whether to schedule an incidental meeting during the next date and time that is available for all the invitees and the location of the meeting in the general location of the invitees (step 250). The availability is based on the other meetings and absences already recorded in table 34 for the invitees. If the user requests to schedule the incidental meeting, scheduler program 33 sends a meeting notice/request to the invites via their respective wireless devices. The meeting notice indicates the purpose of the meeting, agenda and the proposed location, date and time for the meeting. If the wireless device is a cell phone, pager, laptop computer or PDA, then the meeting notice can be sent by short messaging service ("SMS"), text message, e-mail, or even voice message from a voice synthesizer. Next, scheduler program 33 waits for the response from each of the invitees. If all the invitees respond that they will attend the meeting at the specified location, date and time (decision 260, yes branch), then scheduler program 33 will schedule the meeting and notify the invitees that the meeting has been scheduled (step 265). However, if one or more of the invitees responds that he or she cannot attend the meeting (decision 260, no branch), then scheduler program 33 notifies the user (step 275). In such a case, the user can schedule the meeting by telephone at a later date, or notify scheduler program 33 to wait a predetermined period and then loop back to step 220.

In an alternate embodiment of the present invention, in step 210 the user specifies a "deadline" date and time for scheduling the meeting. If the deadline arrives, and the scheduler program 33 has not already scheduled the meeting incidentally, then the scheduler program sends out a meeting request notice to the invitees for the meeting. This meeting request notice will be for the next date and time that is available to all invitees as indicated in the table 34. The local invitees will be invited to attend the meeting in person or by telephone, and the remote invitees will be invited to attend the meeting by telephone.

FIG. 3 illustrates another embodiment of the present invention. In this other embodiment, the user is not attempting to schedule a meeting but to remind the user or another, "target" person to do something when the user or other person travels to a specified location. For example, the specified location can be in or adjacent to a pharmacy, at which time the target person will be reminded to purchase a specified item. In step 300, a reminder program 333 within scheduling tool 10 is invoked. In response, reminder program 333 prompts the user to specify a location or "destination" at which a reminder will occur (step 310). The specification of the location will ordinarily state the street address and city. Alternately, the user can specify the name of a business or owner of a residence and city, and reminder program 333 will consult electronic directory 36 to determine the street address. Next, reminder program 333 will prompt the user to specify the message to display to the user when the user is at or near the specified location (step 320). In the foregoing example, the message would be to buy the specified item from the pharmacy. Next, reminder program 333 reads the address book 30 to learn if the target person has one or more wireless devices with a GPS unit (step 324). If so, reminder program 333 determines which if any of the wireless devices should be used for tracking and the reminder message (step 324). If the target subject has more than one wireless device, the reminder program tracks both for a period to determine which wireless devices moves the most. This is wireless device selected for tracking for purposes of the reminder program. Next, the reminder program 333 reads the address book 30 to determine the unique identifier of the wireless device (step 326). Referring again to step 324, if the target person is not listed in the address book, then reminder program 333 prompts the user to identify a wireless device with a GPS that the target person owns (step 326). This identification is the telephone number of the wireless device in the case of a cell phone or pager, or the IP address in the case of a internet enabled device or a dynamic identification in the case of a device without an identifier for communications. This identification is sufficient to permit the reminder program 333 to track and communicate with the wireless device.

Next, reminder program 333 prompts the user to specify a maximum distance or proximity from the specified location sufficient to initiate the reminder. Then, reminder program 333 requests the current location of the wireless device of the target person (step 360). Reminder program 333 records the wireless device identifier, destination, message, current location and proximity in a table 336. Then, reminder program 333 determines if the current location is within the maximum distance or proximity of the specified location (decision 370). If not, then reminder program 333 waits a predetermined time period (step 386) and then loops back to step 360 to request the current location of the wireless device of the target person. Referring again to decision 370, if the wireless device is currently within the maximum distance or proximity of the specified location, then reminder program 333 notifies the target person of the event, such as to buy the specified item from the pharmacy (step 380). This notification is made via the wireless device such as by SMS, text message, e-mail or voice mail.

Based on the foregoing, a scheduling tool including a scheduler program and a reminder program in accordance with the present invention have been disclosed. However, numerous modifications and substitutions can be made without deviating from the scope of the present invention. For example, selected people, such as in a common organization, can be made aware of each other's nearby presence by scheduling them for an incidental meeting using the present invention. Therefore, the present invention has been disclosed by way of illustration and not limitation, and reference should be made to the following claims to determine the scope of the present invention.

What is claimed is:

1. A method for scheduling meeting, said method comprising the steps of:
    a person specifying to a scheduling program two or more invitees for a meeting, each of said invitees having a wireless device with a GPS unit or other geographic locating unit;
    configuring said scheduling program such that if said two or more invite are within a first proximity of each other or a specified location by a predetermined date, the scheduling program automatically notifies said person that said two or more invitees re within said first proximity of each other or said specified location, and in response, enables said person to schedule a meeting between said two or more invitees,
    configuring said scheduling program such that if said two or more invitees are not within said first proximity of each other or said specified location by said predetermined date, said scheduling program automatically notifies said person that said two or more invitees are not within said first proximity of each other or said specified location and said scheduling program automatically enables said person to specify a second, greater proximity between said two or more invitees or from said specified location; and
    remotely tracking locations of said wireless devices based on geographic information wirelessly transmitted by said wireless devices and received by a computer which executes said scheduling program;
    in response to said two or more invitees being within said second proximity of each other or from said specified location after said predetermined date, said scheduling program automatically notifying said person that said two or more invitees are within said second proximity of each other or from said specified location and in response, said person attempting to schedule a meeting between said two or more invitees;
    wherein either step of said person attempting to schedule a meeting between said two or more invitees comprises the step of said scheduling program determining availability of said two or more invitees based on previously scheduled meetings or absences.

2. A method as set forth in claim 1 wherein after performance of either step of said person attempting to schedule a meeting between said two or more invitees, said scheduling program sending meeting notices to the wireless devices of said two or more invitees.

3. A method as set forth in claim 2 wherein said meeting notices specify a date, time and purpose of said meeting.

4. A method as set forth in claim 1 further comprising the steps of:
    configuring said scheduling program such that in response to said two or more invitees being within said first proximity of each other or said specified location by said predetermined date, said scheduling program notifying said person as to a purpose of said meeting; and
    configuring said scheduling program such that in response to said two or more invitees not being within said first proximity of each other or said specified location by said predetermined date, but said two or more invitees subsequently being within said second proximity of each other or said specified location, said scheduling program notifying said person as to a purpose of said meeting.

5. A method as set forth in claim 4 further comprising the step of said person specifying said purpose of said meeting to said scheduling program in a same session as the step of said person specifying said two or more invitees.

6. A method as set forth in claim 1 further comprising the step of said person specifying said first proximity.

7. A method as set forth in claim 6 further comprising the step of said person specifying said second proximity.

8. A system for scheduling meetings, said system comprising:
- means for enabling a person to specify two or more invitees for a meeting each of said invitees having a wireless device with a GPS unit or other geographic locating unit;
- means for remotely tracking location of said wireless devices based on geographic information wirelessly transmitted by said wireless devices, and
- means, responsive to said two or more invitees being within a first proximity of each other or a specified location by a predetermine date, for automatically notifying said person that said two or more invitees are within said first proximity of each other or said specified location, and in response, enabling said person to schedule a meeting between said two or more invitees;
- means, responsive to said two or more invitees not being within said first proximity of each other or said specified location by said predetermined date, for automatically notifying said person that said two or more invitees are not within said first proximity of each other or said specified location by said predetermined date and automatically prompting said person to specify a second greater proximity between said two or more invitees or from said specified location, and
- means, responsive to said two or more invitee subsequently being within said second proximity of each other or from said specified location, for automatically notifying said person that said two or more invitees are within said second proximity of each other or from said specified location, and enabling said person to schedule a meeting between said two or more invitees;
- wherein both means for enabling said person to schedule a meeting between said two or more invitees comprise means for determining availability of said two or more invitees based on previously schedule meetings or absences.

9. A system as set forth in claim 8 wherein both of said means for enabling said person to schedule a meeting between said two or more invitees includes means, are responsive to said person scheduling a meeting between said two or more invitees, for sending meeting notices to the wireless devices of said two or more invitees.

10. A method as set forth in claim 9 wherein said meeting notices specify a date, time and purpose of said meeting.

11. A method as set forth in claim 8 further comprising:
- means, responsive to said two or more invitees being within said first proximity of each other or said specified location by said predetermined date, for notifying said person as to a purpose of said meeting; and
- means, responsive to said two or more invitees not being within said first proximity of each other or said specified location by said predetermined date, but said two or more invitees subsequently being within said second proximity of each other or said specified location, for notifying said person as to a purpose of said meeting.

12. A system as set forth in claim 8 further comprising means for enabling said person to specify said purpose of said meeting to said scheduling program in a same session as said person specifies said two or more invitees.

* * * * *